O. E. Stephens,
Circular Saw Mill.
N° 16,854. Patented Mar. 17, 1857.
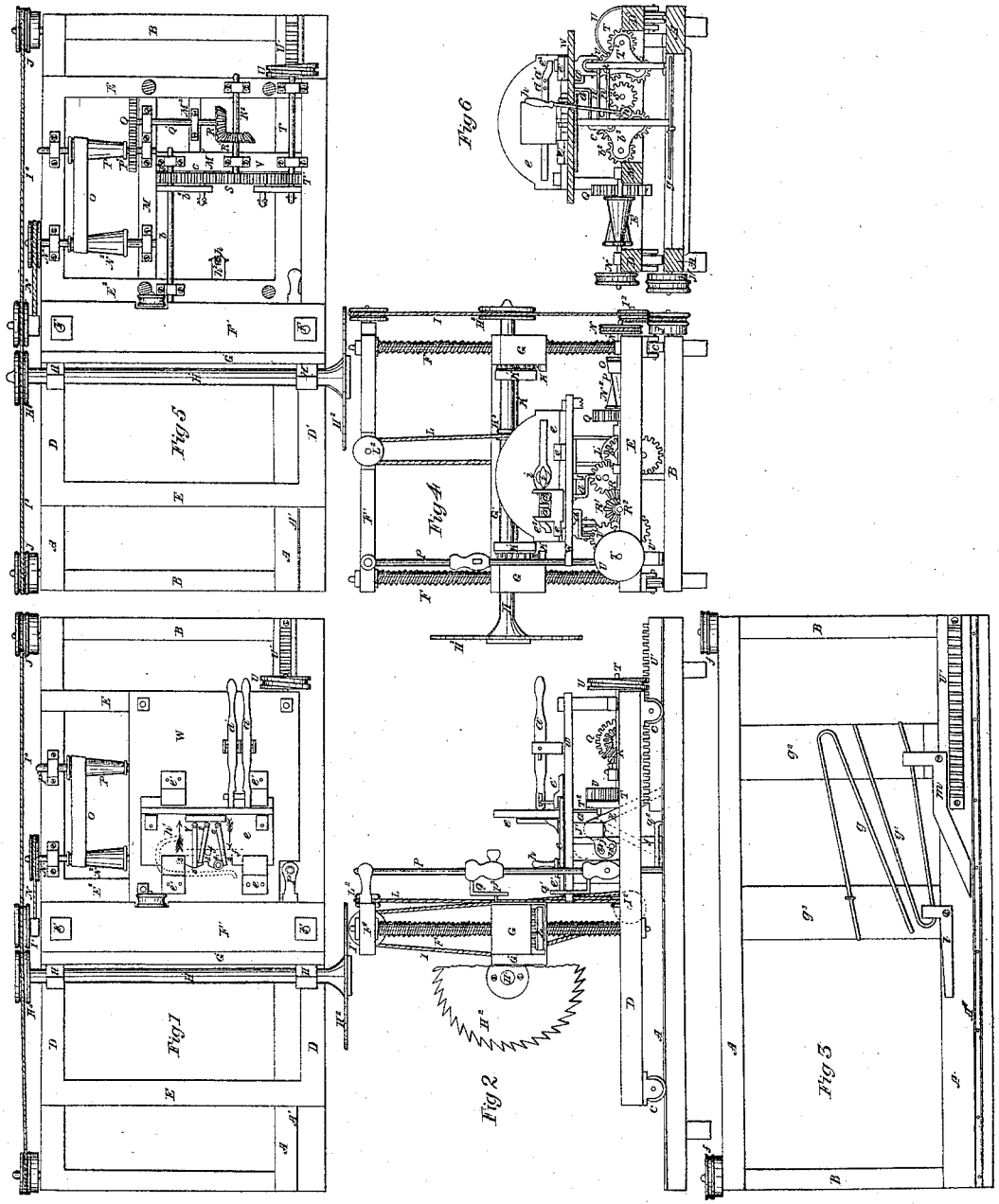

UNITED STATES PATENT OFFICE.

OSBORN E. STEPHENS, OF McCALLS FERRY, PENNSYLVANIA.

PORTABLE RECIPROCATING CIRCULAR SAWING MACHINE.

Specification of Letters Patent No. 16,854, dated March 17, 1857.

*To all whom it may concern:*

Be it known that I, OSBORN E. STEPHENS, of McCalls Ferry, in the county of York and State of Pennsylvania, have invented certain new and useful Improvements in Sawmills; and I do hereby declare that the same are described and represented in the following specifications and drawings.

To enable others skilled in the art to make and use my improvements I will proceed to describe their construction, use, and operation, referring to the drawings in which the same letters indicate like parts in each of the figures.

Figure 1, is a plan or top view of a saw mill with my improvements. Fig. 2, is an elevation. Fig. 3, is a plan of the ways and the parts fastened and connected to them. Fig. 4, is an end elevation. Fig. 5, is a section.

In the accompanying drawings A, A, are the side and B, B, the end sills firmly fastened together so as to make a strong frame. To one of the sills A, the metal way or guide A' is fastened having a flange turned up to which the wheels C, C, of the carriage are fitted so as to guide it as it traverses; the wheels under the other side of the carriage run upon the opposite sill. The carriage is made with two side rails D, D', and two end bars E, E', and a middle bar E² all of which are fastened firmly together to form the frame of the carriage. The screws F, F, are fastened in the rails D, D', and are connected at the top by the bar F', as shown in the drawing. The boxes G, G, are fitted to traverse on the screws F, F, and are connected by the bar G', which is fastened to them, to which bar the boxes H, H, are fastened for the saw shaft H', to turn in and carry the saw H² fastened upon one end of it as shown in the drawing and the pulley H³ is fastened on the opposite end of the shaft to which the band I, is applied to turn it. This band I passes entirely around the pulley H³, up over the pulley I', on a stud in the bar F', and down under the pulley I², on a stud in the rail D, the pulley I², being made to receive the band I³, which entirely surrounds it and passes over the pulleys J, and J', on studs fastened in the sill A, the pulley J' being fitted to receive another band from the moving power which is to operate the mill. There is a cavity in the lower part of the boxes G, G, for the gears K, K, which are provided with female screws fitted to the screws F, F, so that when the gears K, K, are turned by the gears K', K', the boxes are traversed on the screws so as to move the saw up or down as may be required. The gears K', are fastened to the shaft K² which turn in the boxes G, G, and this shaft has the pulley K³, fastened to it which is surrounded by the band L, which passes under the pulley L' and over the pulley L² which turns on a stud in the bar F', as shown in the drawing. In the carriage the bar M, is fastened to the end bar E', and the middle bar E², and the bar M', is fastened between the bar M and rail D', and the bar M², between the bars M' and E' all as shown in the drawing Fig. 5, to support the journals of the shafts which give motion to some parts of the mill.

There is a small pulley on the inside of the pulley I², for the band N, which turns the pulley and shaft N', which turns in the bar M, and rail D. The shaft N', has the cone N², fastened to it, to carry the band O, which connects it to the cone P, on the shaft P' arranged parallel to the shaft N' as shown in the drawing, Fig. 5, so that by changing the position of the band O, on the cones the speed of the shaft P' may be varied, so as to operate the machinery driven by it faster or slower as desired. The pinion P², on the shaft P', turns the gear, Q, on the shaft Q', which turns in the bars M and M², as shown in the drawing. The shaft Q', carries the gear R, which turns the gear R', on the shaft R², which is supported by the bars E' and M', and carries the gear S, which is fastened to it.

The shaft T, lies parallel to the shaft R², and turns in the same bars having the gear T', fastened to it; the end of this shaft T, turns in the triangular link T² which is made in the form shown in Fig. — and has two studs fastened in it for the gear V, which turns the gear T', and the gear V', which turns the gear V. The link T², is vibrated by the rod *a* which connects it to the lever *a'*, above the platform W, so that by operating the lever *a'*, either of the gears V, or V' may be brought into contact with and operated by the gear S, to turn the shaft T, and screw U, either way to traverse the carriage and saw in either direction on the sills or ways as desired; the screw U, acting or working in the rack, U', fastened to the sill A, for that purpose. The pulley L', is fastened to the shaft $b$, which turns in the bars E² and M' and has the gear $b^2$, fastened to it, and it is fitted to turn freely in the triangular link $b^3$, which has two studs fastened in it for the gear $c'$ which turns the gear $b^2$, and the gear $c'$, which turns the gear $c$.

The link $b^3$, is vibrated by the rod $d$, which connects it to the lever $d'$, so that by operating the lever either of the gears $c$, or $c'$, may be brought into contact with and operated by the gear S, to turn the shaft $b$, in either direction with the pulley L', and band L, which carries the gears K', K', and K, K to move the boxes G, G, and saw up or down as desired. The above described machinery enables the attendant by working the levers $a'$, $d'$, to move the saw up or down or traverse it horizontally in either direction.

I will now proceed to describe the machinery to which the said levers $a'$ and $d'$, may be connected so as to operate or move the saw up or down, or traverse it horizontally either way automatically or by the power that operates the saw. $e$, is a traversing guide made in the form shown and fitted to traverse on the platform $w$, under the ends of the brackets $e'$, $e'$. The perpendicular portion of this traversing guide $e$, has an irregular horizontal slot $e^2$, in it made in the form shown in Fig. 4, into which slot the ends of the levers $a'$, and $d'$, may be thrust, so as to be operated by the guide when it is traversed. The stud $f$, is fastened in the guide so as to traverse in the slot $f'$, shown by dotted lines in Fig. 1, this stud projects down between the sills A, A, so as to pass between the springs $g$, $g'$, Fig. 3, which springs are fastened to the bars $g^2$ and $g^3$, the last named bar should be so arranged that it can be fastened in such a position on the sills as will adapt the operation of the spring $g$, to the length of the log being sawed. The springs $g$, and $g'$, act against the stud $f$, as the carriage is traversed so as to move the guide and operate the levers $a'$, and $d'$, to connect and disconnect the gearing below the platform and stop or start the carriage or move the saw up or down. In order to hold the guide $e$, in such position as may be desired there is a series of scores in one edge as shown in Fig. 1, numbered from 1, to 5; into these scores the locking lever $h$, is pressed by the spring $h'$, shown by dotted lines in Fig. 1, and fastened to the under side of the platform $w$. The fulcrum of this locking lever is in the stand $h^2$, fastened to the bar E², Fig. 5. Now when the lever $h$, is in the scores 4, or 5, the ends of the levers $a'$ and $d'$, are in the horizontal part of the slot $e^2$, and the carriage and saw are stationary; but if the guide is moved, so that the lever $h$, is in the score 1, the lever $a'$, is in the left hand end of the score $e^2$ and the gearing below the platform is brought into action so as to traverse the carriage in the direction of the arrow pointing to score 1; and when the guide is moved so, that the lever $h$, is in the score 3, the end of the lever $a'$, will be up over the vibrating guide $i$, in the slot $e^2$ and the gearing put in action to traverse the carriage in the direction of the arrow pointing from score 3. The left hand end of the vibrating guide $i$, is pressed down by the circular spring $i'$, behind it shown in black so that when the guide $e$, is traversed from right to left the ends of the levers $a'$, and $d'$, pass up onto or over the guide $i$; and when the guide $e$, is traversed from left to right the end of the lever $d'$, passes under the vibrating guide $i$, which yields so as to let it pass under it. Now when the lever $h$, is in the score 2, the lever $d'$, will either be under or over the lever $i$; if it is over, the gearing below the platform will be brought into action, so as to move the saw upward; but if the end of the lever $d'$, is under the lever $i$, the gearing will move the saw downward. There are three spring latches on the guide $e$,—6, 7, and 8, which may be swung over the scores 2, 4, and 5, so as to keep the locking lever $h$, out of those scores and let the guide $e$, slip by it. If the latches 6, and 7, are over the scores 4, and 5, the guide $e$, will traverse so as to change the gearing and traverse the carriage in each direction and move the saw up and down, and if the latch 8, is over the score 2, the guide $e$, will slip by the lever $h$, and the gearing will be changed so as to traverse the carriage in each direction, without moving the saw either up or down.

There is an angular lever with two arms $j$, and $k$, arranged to vibrate in the stand $j'$, (Fig. 2,) fastened to the under side of the platform $w$; the arm $j$, has two pins $n$, $n'$, in it which act against the locking lever $h$, to thrown it out of the scores in the guide $e$, so as to let the springs $g$, and $g'$, traverse the guide $e$, by acting on the stud $f$ fastened in it.

There are two levers $l$, and $m$, Fig. 3, which vibrate on pins in the sill A, the lever $l$, should be moved when the bar $g^3$ is moved so as to hold the same relative position to the bar in which it is shown in the drawing. There is a rock shaft $p$, arranged to turn in a stand fastened to the bar F' and in a bracket fastened to the rail D'. This rock shaft has three bent arms fastened to it, see Fig. 2, the two upper ones $q$, and $q'$, are acted on by the pin $p^2$, in the box G, and the lower one $q^2$ acts upon the levers $l$, and $m$, heretofore mentioned. Now when the carriage moves to the right the arm $k$, should be in the position shown in the drawing so as to strike the short arm of the lever $m$, which should retain it so as to carry the pin $n$, against the lever $h$, and throw it out of score 3, so that the spring $g'$, will traverse the guide $e$, so as to change the gear and stop the carriage and put the gear in action to raise the saw the lever $h$, falling into the score 2, to stop the guide $e$; when the saw rises to a proper height the pin $p^2$, acts on the arm $q$, and vibrates the arm $q^2$ so as to move the lever $m$, and operate the arm $k$ (which is resting against it) so as to carry the pin $n'$, against lever $h$, and throw it out of the score 2, so that the guide $e$, is moved further by the spring $g'$ to change the gearing and stop the arrest of the saw; and put the gearing in action to traverse the carriage to the left the lever $h$, falling into the score 1. The carriage is now moving to the left and the arm $k$, is in the position shown by dotted lines Fig. 2, and as the saw passes out of the log the arm $k$, strikes the short arm of the lever $l$, and brings the pin $n'$ against the lever $h$, and throws it out of score 3, while the spring $g$, acting against the stud $f$, traverses the guide $e$, so as to change the gearing and stop the carriage and put the gears in action to lower the saw; when the saw has descended far enough the pin $p^2$, acts on the arm $q'$, and carries the arm $q^2$, against the lever $l$, to move the arm $k$, and bring the pin $n$, against the lever $h$, and throw it out of score 2 (where it has been resting) and release the guide $e$, so that the spring $g$, moves it and changes the gearing to stop the descent of the saw, and puts the gearing in action to traverse the carriage to the right the locking lever being in the score 3.

The saw mill having been constructed and completed as above described and placed beside a log arranged on two supports which may be made like the head and tail blocks of a common saw mill carriage and provided with some kind of dogs to hold the log while it is being sawed. The saw may now be set in motion and brought to a proper height to pass under the log and the feeding machinery heretofore described, is put into gear by moving the lever $a'$; and bringing the gear $v$, to the gear S, so as to turn the screw U, and move the carriage and saw to cut through the log lengthwise. When the saw goes out at the opposite end of the log the end of the lever $k$, strikes the short arm of the lever $l$, so that the lever $k$, is moved and the pins $n$, $n'$, throw the lever $h$ out of the score 3, in the guide $e$, which is traversed by the spring $g$ acting on the stud $f$ so that the guide $e$, raises the end of the lever $a'$, and stops the carriage by releasing the gear the guide at the same time raised the lever $d'$, and brought the gear $c'$, to the gear S so as to operate the machinery heretofore described to raise the saw; when the saw arrives to the height required the pin $p^2$, strikes the arm $q$, and the arm $q^2$ moves the lever $l$, which operates the lever $k$, so that the pin $n'$, throws the locking lever $h$ back to release the guide $e$, which is moved by the spring $g$, so that the end of the lever $d'$ is brought into the horizontal part of the slot $e^2$, and releases the gear to stop the upward motion of the saw. At the same time the end of the lever $a'$, was carried up by the vibrating guide $i$, so as to put the gear $v'$ into contact with the gear S, and traverse the carriage in the opposite direction so that the saw cuts a score in the upper side of the log right over and down into the score it cut when it was traversed the other way.

When the saw goes out of the log at the end where it first started the end of the lever $k$, strikes the short arm of the lever $m$, so as to arrest it and raise the locking lever out of the score 1, in the guide $e$, which is traversed by the spring $g'$, acting against the stud $f$, so as to bring the end of the lever $a'$, into the horizontal part of the slot $e^2$, and stop the carriage at the same time the end of the lever $d'$, passed down below the vibrating guide $i$, and brought the gear $c$, into the gear $s$, so as to put the machinery in operation to move the saw down. When the saw has descended far enough the pin $p^2$, strikes the arm $q'$, and vibrates the arm $q^2$ so as to move the long arm of the lever $m$ and moves the lever $k$, to throw back the locking lever $h$, so that the spring $q'$, acting against the stud $f$ traverses the guide $e$ so as to bring the end of the lever $d'$, into the horizontal part of the slot $e^2$, releasing the gear to stop the descent of the saw; and at the same time, the end of the lever $a'$ passes into the inclined part of the slot $e^2$ so as to put the gear $v$, in contact with the gear $s$, to turn the screw U and traverse the carriage the other way to cut a second score in the under side of the log; the attendant having moved the log a proper distance toward the saw for a new cut while the saw was descending beyond the end of the log.

By drawing back the lever $d'$, and operating it by hand the saw may be moved up or down at the same time that it is traversed horizontally so as to saw a crooked log. If the ways which the carriage traverses upon are made long enough, several short logs may be arranged in succession and the saw traversed so as to cut a score in each log.

Some of the advantages of my improvements are as follows. The ways may be far shorter than in mills where the log is traversed; as in such mills the ways have to be twice as long as the log; but in my mill the ways are only required to be as long as the log and carriage that carries the saw, therefore it occupies far less room. It is far cheaper than any other saw mill, and it is also far lighter and can be operated to advantage with less power, as the saw may be traversed several times in the same score cutting a little deeper each time it is traversed.

I contemplate that the traversing guide $e$, may be made with two slots that is one for each of the levers $a'$, and $d'$, if preferred.

I believe I have described and represented my improvements in saw mills so as to enable any person skilled in the art to make and use them. I will now state what I desire to secure by Letters Patent, to wit:

1. I claim a saw arranged to traverse horizontally so as to cut a score in one side of the log to be sawed and then move perpendicularly so as to traverse horizontally in the opposite direction, to cut a score in the opposite side of the log to correspond with and cut into the first score and cut off a portion of the log substantially as described in the foregoing specification.

2. I claim the devices substantially such as are described in the foregoing specification for changing automatically or by hand the motion of the carriage which traverses the saw horizontally in each direction for the purposes set forth.

3. I claim the devices substantially such as are described in the foregoing specification for changing automatically or by hand the motion of the carriage that traverses the saw perpendicularly for the purposes set forth.

4. I also claim the latches arranged to fill the scores in the guide $e$, so as to let it slip by the locking lever $h$, as described.

In testimony whereof, I have hereunto signed my name.

OSBORN E. STEPHENS.

Witnesses:
W. A. Boss,
John S. Hollingshead.